United States Patent
Lansky et al.

[11] 3,720,290
[45] March 13, 1973

[54] SUPERSONIC LUBRICATOR

[75] Inventors: Zdenek J. Lansky, Solon, Ohio; Lester W. Malinowski, Kalamazoo, Mich.

[73] Assignee: Parker Hannifin Corporation, Cleveland, Ohio

[22] Filed: Jan. 5, 1971

[21] Appl. No.: 104,010

[52] U.S. Cl. ............... 184/55 A, 184/6.26, 239/102, 261/DIG. 48
[51] Int. Cl. .................................................. F16n 7/34
[58] Field of Search........184/6.26, 55 R, 55 A, 56 R, 184/56 A; 137/604; 259/4, DIG. 44; 261/78.1, 1, DIG. 48; 239/102

[56] References Cited

UNITED STATES PATENTS

| | | |
|---|---|---|
| 3,166,900 | 1/1965 | Stegen ........................ 261/DIG. 48 |
| 2,532,554 | 12/1950 | Joeck ........................................ 261/1 |
| 3,371,869 | 3/1968 | Hughes ................................. 239/102 |
| 3,540,551 | 11/1970 | Ohshida .............................. 184/56 A |
| 2,710,673 | 6/1955 | Costes ................................. 184/55 A |
| 3,411,609 | 11/1968 | German ............................... 184/55 A |
| 3,244,257 | 4/1966 | German et al. ..................... 184/55 A |
| 3,384,103 | 5/1968 | Lansky ........................... 184/55 A X |
| 3,506,589 | 4/1970 | Hoffman et al. ..................... 259/4 X |

FOREIGN PATENTS OR APPLICATIONS

| | | | |
|---|---|---|---|
| 945,692 | 1/1964 | Great Britain ....................... 239/102 |

Primary Examiner—Manuel A. Antonakas
Attorney—Diller, Brown, Ramik & Holt

[57] ABSTRACT

This disclosure relates to an air line lubricator wherein liquid lubricant supplied to an air passage thereof is broken up into fine particles so as to form a mist by passing the lubricant through a supersonic whistle positioned within the air passage.

17 Claims, 7 Drawing Figures

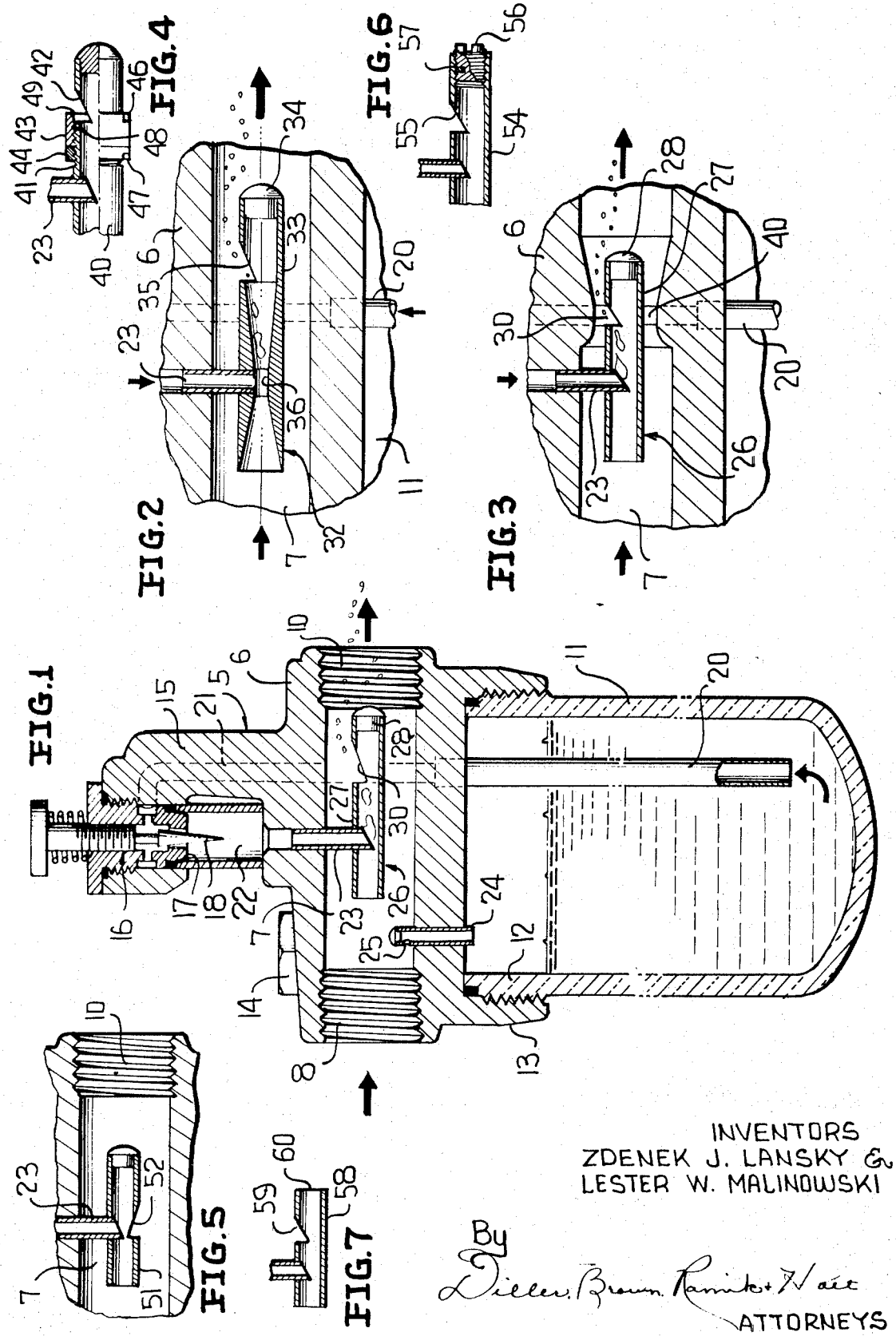

SUPERSONIC LUBRICATOR

This invention relates in general to new and useful improvements in air line lubricators, and more particularly to novel apparatus for supplying lubricant to air in the form of a mist.

BACKGROUND OF THE INVENTION

Conventional air line lubricators include an air passage, a supply of liquid lubricant, and means for introducing the lubricant into the air passage in a manner to cause the liquid lubricant to be broken up into fine particle or mist form and be dispersed throughout the air passing through the passage. It is desirable that the particle size be very small, that a thorough mixing with the air be accomplished and that pressure drop of air passing through the lubricator be kept to a minimum.

SUMMARY

In accordance with this invention, a mist generator in the form of a supersonic whistle is mounted within the air passage of an air line lubricator, the mist generator receiving lubricant droplets and converting them into mist, which mist is then distributed into the air passing through the air passage.

The whistle is mounted within the air passage and as the air passes through the whistle opening it undergoes turbulent flow that creates sound waves that shred the lubricant droplets to break them into fine particles and thoroughly mixes the particles with the air passing through the whistle. The particle size is a function of the sonic frequency and may be varied by varying the frequency of the latter.

The whistle may be of various suitable constructions. In one form it comprises a tube of uniform diameter, closed at one end and having a side opening therein adjacent the closed end. A lubricant tube extends into the whistle tube between the open end thereof and the side opening and is shaped and positioned so as to create a pressure drop in the air passing through the whistle tube whereby lubricant is drawn into the whistle tube.

In another form of the invention, the whistle tube has a venturi section into which the lubricant tube opens whereby the lowered pressure in the venturi section causes lubricant to be drawn into the whistle tube.

In still other forms of the invention a means may be provided for varying the position of the side opening relative to the end of the tube whereby the sonic frequency, and hence the lubricant particle size, may be adjusted or varied.

With the above and other objects in view that will hereinafter appear, the nature of the invention will be more clearly understood by reference to the following detailed description, the appended claimed subject matter, and the several views illustrated in the accompanying drawing.

DESCRIPTION OF THE INVENTION

FIG. 1 is a vertical sectional view taken through an air line lubricator utilizing a whistle tube of uniform inside diameter as a mist generator.

FIG. 2 is an enlarged fragmentary sectional view showing a whistle type mist generator in which the whistle tube includes a venturi section.

FIG. 3 is an enlarged fragmentary sectional view similar to FIG. 2 and shows still another form of mist generator in which the air passage around the whistle tube has a venturi section.

FIG. 4 is a fragmentary view showing a means for varying the size of the side opening in the whistle tube.

FIG. 5 is a fragmentary view showing a modified form in which the lubricant feed tube is opposite the side opening in the whistle tube.

FIG. 6 is a fragmentary cross section view showing a means for varying the frequency of the sound waves.

FIG. 7 is a view of a further modified whistle tube that is open on both ends.

In the drawing, air line lubricator 5 includes a housing 6 having an air passage 7 therethrough. The air passage 7 includes an inlet 8 and outlet 10 to which suitable air lines may be connected.

Lubricator 5 is also provided with a lubricant source in the form of a bowl 11 having an upper portion 12 which is threadably engaged with a sleeve portion 13 of housing 6.

Housing 6 has a filling passage (not shown) closed by a filler cap 14 wherein filling of bowl 11 may be accomplished without removing same.

Housing 6 has an upper extension 15 in which a metering valve 16 is mounted. The metering valve 16 includes valve element 17 and an adjustable meter valve 18.

A pick-up tube 20 extends down into bowl 11 and is in communication with a lubricant passage 21 which opens into the metering valve 16. Metered lubricant passes from metering valve 16 into a sight glass 22 and then into a lubricant tube 23 projecting into air passage 7.

Lubricant within bowl 11 is forced up through pick-up tube 20 and to metering valve 16 by air pressure within bowl 11. This air pressure is supplied by a pressure tap 24 extending from air passage 7 down into bowl 11. Pressure tap 24 has an entrance opening 25 which faces upstream to transmit velocity pressure of the air in passage 7 to the bowl so that the pressure in the bowl is somewhat greater than the pressure in air passage 7. In a typical installation, air is applied at inlet 8 at the rate of 125 cfm and 80 psi. Air pressure at outlet 10 is 75 psi and air pressure within bowl 11 is 82 psi.

In order that lubricant supplied through lubricant 23 may be atomized and delivered into the air passing through air passage 7 in the form of a mist, there is provided a mist generator 26. Mist generator 26 is in the form of a simple supersonic whistle includIng a tube 27 of uniform inside diameter having its downstream end closed by a plug 28 and being provided with a generally triangular side opening 30 adjacent the plugged end.

Whistle tube 27 is supported on lubricant tube 23 by a press fit between the two where the lubricant tube extends into the whistle tube between the open end of the whistle tube and side opening 30. The lower end of lubricant tube 23 is cut at an angle and faces generally downstream so as to lower the pressure of air in the whistle tube adjacent the lower end of lubricant tube 23 to further increase the differential in pressure between the pressure in the whistle tube and that in bowl 11 whereby such differential causes lubricant to pass from bowl 11 through pickup tube 20, passage 21, chamber 22 and tube 23 into whistle 26 where it is carried to opening 30.

Air passing out through opening 30 becomes turbulant and creates supersonic waves that tear the lubricant droplets into very fine particles which become thoroughly mixed with the air passing through the side opening.

In FIG. 2 there is illustrated a modified form of whistle type mist generator 32 which includes a tube 33 having a plug 34 closing the downstream end thereof and being provided with a generally triangular side opening 35 adjacent the plugged end.

Generator 32 is supported by lubricant tube 23, but in lieu of tube 23 passing into tube 33, tube 33 is provided with a venturi section 36 between the tube inlet and opening 35. Lubricant tube 23 opens into venturi section 36. Lubricant is drawn into whistle tube 33 due to pressure drop in venturi section 36.

In the modification of FIG. 3, whistle tube 26 is the same as that in FIG. 1 but air passage 7 is provided with a venturi section 40 opposite side opening 30. This causes an increase in the velocity of the air in passage 7 as it passes over opening 30 as well as a decrease in the pressure thereof and further assists atomization and mixing of the oil with the air. The venturi 40 may likewise be used in conjunction with the venturi type whistle generator 32 of FIG. 2.

In the modification of FIG. 4 a cylindrical whistle tube 40 has a thread 41 formed between lubricant tube 23 and side opening 42 and a sleeve 43 and a locknut 44 are threaded thereon. The sleeve 43 and locknut 44 may have notches 46, 47 therein for receiving a tool for turning the same. Whistle tube 40 has a smooth diameter portion 48 between thread 41 and notch 42 that has a close sliding fit with a smooth cylindrical portion 49 of sleeve 43. Threading sleeve 43 in one direction or the other on thread 41 increases or decreases the size and shape of side opening 42 which adjusts and controls the variation in the size of the particles of lubricant and which to some extent also varies the particle size by varying the pitch or frequency of the sound waves.

In the modification of FIG. 5 whistle tube 51 is turned upside down from the position shown in FIG. 1 and lubricant tube 23 enters the whistle tube radially opposite side opening 52, therefore delivering the oil directly into the zone of turbulent air within the whistle tube.

FIG. 6 shows a whistle tube 54 in which the downstream end of the same is closed by a plug 56 threaded thereinto. The plug may be adjusted inwardly or outwardly by the threaded connection to vary the distance between the side opening 55 and the closed end of the tube 54 to thereby vary the frequency of the sound waves generated and hence the particle size of the lubricant. The plug is locked in its set position by an elastomeric insert 57 that frictionally engages the internal thread of the tube.

In another form as shown in FIG. 7 the whistle tube 58 may be open on both ends, in which case the tube must be shorter between the side opening 59 and the downstream end 60 than a tube with a closed end in order to produce the same frequency of sound wave.

In other forms of the invention the sound wave producing means may be a reed or other device rather than a whistle tube.

Preferably the sound waves are in the supersonic range of 15,000 cycles per second or more but in some applications may be as low as 10,000 cycles per second. A preferred frequency is 20,000 cycles per second.

We claim:

1. An airline lubricator comprising a housing having an air passage therethrough and a source of lubricant, means within said air passage for receiving a portion only of air passing through said air passage and creating sound waves, and passage means for delivering lubricant from said source across said air passage and to said sound creating means for dividing the lubricant into small particles by the sound waves and delivering the small particles to the downstream side of the air passage.

2. The lubricator of claim 1 in which said means for creating sound waves is in the form of a whistle tube having an opening in its side.

3. The lubricator of claim 2 in which said passage means for delivering lubricant to the whistle tube includes a conduit communicating with the interior of the whistle tube between said side opening and an open end of the tube upstream of the side opening.

4. The lubricator of claim 1 in which the sound waves have a frequency of over 10,000 cycles per second.

5. The lubricator of claim 3 in which said whistle tube includes a venturi section and said conduit projects into the interior of the whistle tube and has a sloping end facing toward said side opening.

6. The lubricator of claim 3 in which said whistle tube is suspended in said air passage by said conduit.

7. The lubricator of claim 2 in which said air passage includes a venturi section and said whistle tube is positioned in said air passage with said side opening within the venturi section.

8. The lubricator of claim 2 in which there is a means for varying the size of the side opening.

9. The lubricator of claim 2 in which the whistle tube has an open end facing the upstream side of the air passage and a closed end and said side opening is between said ends.

10. The lubricator of claim 9 in which there is a means for varying the distance between the side opening and said closed end.

11. The lubricator of claim 2 in which there is a means for varying the position of the side opening along the length of the tube.

12. The lubricator of claim 1 in which there is a means for varying the frequency of said sound waves.

13. An airline lubricator comprising a housing having a passage for air under pressure and having a reservoir containing lubricant, a tube in said air passage extending axially therealong and having a first opening therein facing upstream of the air passage to receive air therefrom and having a second opening downstream of the first opening and communicating with the air passage, means for creating sound waves in the tube when air passes from the first opening to the second, means connecting the upstream end of the air passage to the reservoir to create a pressure upon the lubricant therein, a conduit connecting the reservoir to the interior of the tube, means creating a lower pressure at the connection of the conduit to the tube than in said reservoir whereby lubricant flows to the tube and is divided into small particle size by said sound waves, said particles being carried by the air passing from said first opening to the second opening and delivered to the downstream side of the air passage.

14. The lubricator of claim 13 in which there is a means for varying the frequency of the sound waves.

15. The lubricator of claim 13 in which the second opening is in the side of the tube the connection of the conduit to the tube is radially opposite said side opening.

16. The lubricator of claim 13 in which said sound waves have a frequency of more than 15,000 cycles per second.

17. The lubricator of claim 13 in which said tube is open on both ends.

* * * * *